US009847675B2

(12) United States Patent
Miwa et al.

(10) Patent No.: US 9,847,675 B2
(45) Date of Patent: Dec. 19, 2017

(54) POWER RECEIVING DEVICE AND POWER FEEDING SYSTEM

(71) Applicant: SEMICONDUCTOR ENERGY LABORATORY CO., LTD., Atsugi-shi, Kanagawa-ken (JP)

(72) Inventors: Misako Miwa, Miyagi (JP); Shuhei Maeda, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 496 days.

(21) Appl. No.: 13/709,424

(22) Filed: Dec. 10, 2012

(65) Prior Publication Data

US 2013/0154385 A1 Jun. 20, 2013

(30) Foreign Application Priority Data

Dec. 16, 2011 (JP) ................................. 2011-275256

(51) Int. Cl.
*H02J 17/00* (2006.01)
*H02J 5/00* (2016.01)
(Continued)

(52) U.S. Cl.
CPC .............. *H02J 17/00* (2013.01); *H02J 5/005* (2013.01); *H04B 5/0037* (2013.01); *H04B 5/0093* (2013.01); *H02J 7/025* (2013.01)

(58) Field of Classification Search
CPC .. H02J 5/005; H02J 7/025; H02J 17/00; H02J 7/35; H02J 1/10; H02J 1/102;
(Continued)

(56) References Cited

U.S. PATENT DOCUMENTS 6,164,532 A * 12/2000 Suga .................... G06K 7/0008
235/375
6,321,067 B1 11/2001 Suga et al.
(Continued)

FOREIGN PATENT DOCUMENTS

EP 0829940 A 3/1998
JP 10-145987 A 5/1998
(Continued)

OTHER PUBLICATIONS

Kurs.A et al., "Wireless Power Transfer via Strongly Coupled Magnetic Resonances,", Science, Jul. 6, 2007, vol. 317, No. 5834, pp. 83-86.

*Primary Examiner* — Thienvu Tran
*Assistant Examiner* — Brian K Baxter
(74) *Attorney, Agent, or Firm* — Nixon Peabody LLP; Jeffrey L. Costellia

(57) ABSTRACT

The invented power feeding system includes power transmitting and power receiving devices. The power transmitting device includes an AC power source, a first electromagnetic induction coil, a first resonant coil, and a first capacitor. The power receiving device includes an antenna unit including a second resonant coil, a second capacitor, and a second electromagnetic induction coil; a charging circuit unit including a rectifier circuit, a power storage device, a current detection circuit for detecting a current value supplied to the power storage device, and a voltage detection circuit for detecting a voltage value applied to the power storage device; and a communication control unit including a control circuit for generating a selection signal based on the detected current value and the detected current voltage, a plurality of switches to be turned on or off by the selection signal, and passive elements electrically connected to the plurality of switches.

8 Claims, 7 Drawing Sheets

(51) Int. Cl.
*H04B 5/00* (2006.01)
*H02J 7/02* (2016.01)

(58) Field of Classification Search
CPC .... H01F 38/14; H01F 38/10; H01F 2038/143; B60L 11/182; D06F 75/26; G01V 3/08; G05F 1/67; G06F 13/4086; G06F 1/26; Y02E 60/12; H04B 3/56; H04B 2203/5483
USPC .................................. 307/99, 149, 104, 43
See application file for complete search history.

(56) References Cited

U.S. PATENT DOCUMENTS

| | | | |
|---|---|---|---|
| 6,427,065 B1 | 7/2002 | Suga et al. | |
| 8,026,694 B2 | 9/2011 | Kamijo et al. | |
| 8,188,709 B2 | 5/2012 | Onishi et al. | |
| 8,450,877 B2 | 5/2013 | Baarman et al. | |
| 8,531,059 B2 | 9/2013 | Ichikawa et al. | |
| 8,542,018 B2 | 9/2013 | Yoshikawa | |
| 8,766,483 B2 * | 7/2014 | Cook | H02J 5/005 307/104 |
| 2002/0065061 A1 * | 5/2002 | Schiltz | H03D 7/1425 455/326 |
| 2002/0089369 A1 * | 7/2002 | Ikeda | H02M 3/07 327/536 |
| 2007/0164122 A1 * | 7/2007 | Ju | 235/492 |
| 2007/0164844 A1 * | 7/2007 | Lin et al. | 338/13 |
| 2008/0197804 A1 * | 8/2008 | Onishi | H02J 7/025 320/108 |
| 2009/0102292 A1 * | 4/2009 | Cook | H01Q 1/248 307/104 |
| 2009/0308937 A1 | 12/2009 | Yagi et al. | |
| 2009/0322307 A1 * | 12/2009 | Ide | H02J 5/005 323/355 |
| 2010/0097830 A1 * | 4/2010 | Wang | H02M 3/33576 363/126 |
| 2010/0187913 A1 * | 7/2010 | Smith | H04B 5/0081 307/104 |
| 2010/0244577 A1 | 9/2010 | Shimokawa | |
| 2010/0259109 A1 | 10/2010 | Sato | |
| 2011/0018358 A1 | 1/2011 | Kozakai | |
| 2011/0193417 A1 | 8/2011 | Hirasaka et al. | |
| 2011/0241435 A1 | 10/2011 | Saito | |
| 2011/0264945 A1 * | 10/2011 | Tsai et al. | 713/340 |
| 2011/0267002 A1 * | 11/2011 | Baarman et al. | 320/108 |
| 2011/0270462 A1 | 11/2011 | Amano et al. | |
| 2012/0032521 A1 | 2/2012 | Inoue et al. | |
| 2012/0133212 A1 * | 5/2012 | Kamata | 307/104 |
| 2012/0161537 A1 * | 6/2012 | Kamata | 307/104 |
| 2013/0069585 A1 | 3/2013 | Kamata | |
| 2013/0082648 A1 | 4/2013 | Kamata | |
| 2013/0119776 A1 | 5/2013 | Kamata | |
| 2013/0127405 A1 * | 5/2013 | Scherer et al. | 320/108 |
| 2013/0147281 A1 | 6/2013 | Kamata | |
| 2013/0241301 A1 | 9/2013 | Maeda et al. | |
| 2013/0249309 A1 | 9/2013 | Miwa et al. | |

FOREIGN PATENT DOCUMENTS

| | | |
|---|---|---|
| JP | 2002-101578 | 4/2002 |
| JP | 2006-180073 | 7/2006 |
| JP | 2009-011129 | 1/2009 |
| JP | 2009-189231 | 8/2009 |
| JP | 2009-302953 A | 12/2009 |
| JP | 2010-119246 | 5/2010 |
| JP | 2010-154700 A | 7/2010 |
| JP | 2010-193598 | 9/2010 |
| JP | 2010-239690 | 10/2010 |
| JP | 2010-239838 A | 10/2010 |
| JP | 2010-246292 A | 10/2010 |
| JP | 2010-252468 | 11/2010 |
| JP | 2010-284058 A | 12/2010 |
| JP | 2010-284066 | 12/2010 |
| JP | 2011-029799 | 2/2011 |
| JP | 2011-121456 A | 6/2011 |
| JP | 2011-166883 | 8/2011 |
| JP | 2011-197818 A | 10/2011 |
| JP | 2011-223716 | 11/2011 |
| JP | 2012-060730 | 3/2012 |
| JP | 2012-060731 | 3/2012 |
| JP | 2012-514896 | 6/2012 |
| WO | WO-2010/080737 | 7/2010 |

* cited by examiner

POWER RECEIVING DEVICE AND POWER FEEDING SYSTEM

BACKGROUND OF THE INVENTION

1. Field of the Invention

One embodiment of the invention disclosed herein relates to a power receiving device and a power feeding system.

2. Description of the Related Art

Various electronic appliances have spread, and a variety of products are shipped to the market. In recent years, portable electronic devices such as mobile phones and digital video cameras have widely spread. Further, electric propulsion moving vehicles that are powered by electric power, such as electric cars, appear on the market as products.

In such mobile phones, digital video cameras or electric propulsion vehicles, power storage devices serving as power storage means (referred to as batteries and storage batteries) are incorporated. Currently, power feeding to such a power storage device is performed in most cases by direct connection to a household AC power source which is a power feeding means. In addition, a structure without a power storage device or a structure which does not use electric power fed to a power storage device is directly fed with power from a household AC power source through a wiring or the like so that a unit operates.

On the other hand, methods by which electric power is fed to power storage devices without making contact or electric power is fed to loads without making contact have been researched and developed. Typical methods are an electromagnetic coupling method (also referred to as electromagnetic induction method, see Reference 1), a radio wave method (also referred to as microwave method), and a magnetic resonant method (also referred to as resonant method, see References 2 to 3).

As described in References 2 to 4, in a contactless power feeding technique using a magnetic resonant method, a device that receives electric power (hereinafter, referred to as power receiving device) and a device that supplies power (hereinafter, referred to as power transmitting device) each have a resonant coil. Further, in each of the power receiving device and the power transmitting device, an electromagnetic induction coil is provided. Power feeding from a power source to the resonant coil of the power transmitting device and power feeding from the resonant coil to a load of the power receiving device are conducted through the electromagnetic induction coils.

The resonant frequencies (LC resonance) of the resonant coils of the power transmitting device and the power receiving device are set to be the same so that a magnetic resonance phenomenon is produced at a specific frequency.

When the resonant coils of the power transmitting device and the power receiving device face each other, they make a magnetic resonance phenomenon, and thereby efficient power transmission is achieved even when the distance between the resonant coils is large (see non-patent document 1).

REFERENCE

Patent Documents

[Patent Document 1] Japanese Published Patent Application No. 2011-223716
[Patent Document 2] Japanese Published Patent Application No. 2011-29799
[Patent Document 3] Japanese Published Patent Application No. 2011-166883

Non-Patent Document

[Non-Patent Document 1]
"Wireless power supply 2010, all about contactless charging and wireless energy transfer", *Nikkei Electronics*, Mar. 2010, pp. 66-81.

SUMMARY OF THE INVENTION

As charging of a power storage device proceeds, charging current decreases, thereby causing a problem of an increase in the resistance value of a power receiving device.

The increase in the resistance value of the power receiving device has a great effect on coupling of resonant coils between which power transmission is performed using a magnetic resonance phenomenon; accordingly, power transmission efficiency may decrease. For example, if the resistance value of the power receiving device is increased, LC resonance of resonant coils cannot be maintained, so that the magnetic resonance phenomenon that has been generated stops.

Further, in a contactless power feeding system, using electromagnetic induction coils and resonant coils, communication between a power transmitting device and a power receiving device is preferably performed at the same time as power feeding because information of each of the power transmitting device and the power receiving device can be exchanged. For example, when the charging of the power storage device is completed, information about the completion of charging of the power storage device is transmitted from the power receiving device to the power transmitting device and power transmission from the power transmitting device to the power receiving device is stopped. Thus, overcharge of the power storage device can be prevented.

However, the increase in the resistance value of the power receiving device affects the degree of modulation of a modulation signal transmitted between the power receiving device and the power transmitting device. In such a case, the modulation signal received by either or both of the power transmitting device and the power receiving device cannot be read out; thus, there is a possibility that the stability of communication between the power transmitting device and the power receiving device cannot be secured.

In view of the above, an object of one embodiment of the disclosed invention is to provide a power feeding system capable of suppressing a decrease in power transmission efficiency in power feeding to a power storage device.

Further, an object of one embodiment of the disclosed invention is to provide a power feeding system capable of securing the stability of communication performed at the same time as power feeding.

One embodiment of the disclosed invention relates to a power receiving device which includes an antenna unit including a resonant coil, a capacitor, and an electromagnetic induction coil; a charging circuit unit including a rectifier circuit, a power storage device, a current detection circuit for detecting a current value supplied to the power storage device, and a voltage detection circuit for detecting a voltage value applied to the power storage device; and a communication control unit including a control circuit for generating a selection signal based on the detected current value and the detected voltage value, a plurality of switches to be turned on or off by the selection signal, and passive elements electrically connected to the plurality of switches.

One embodiment of the disclosed invention relates to a power feeding system which includes a power transmitting device and a power receiving device. The power transmitting device includes an AC power source, a first electromagnetic induction coil, a first resonant coil, and a first capacitor. The power receiving device includes an antenna unit including a second resonant coil, a second capacitor, and a second electromagnetic induction coil; a charging circuit unit including a rectifier circuit, a power storage device, a current detection circuit for detecting a current value supplied to the power storage device, and a voltage detection circuit for detecting a voltage value applied to the power storage device; and a communication control unit including a control circuit for generating a selection signal based on the detected current value and the detected voltage value, a plurality of switches to be turned on or off by the selection signal, and passive elements electrically connected to the plurality of switches.

As charging of the power storage device proceeds, the resistance value of the power storage device is increased and the resistance value of the whole power receiving device is increased. Thus, power transmission efficiency is decreased. However, by the connection of the most appropriate passive element among the passive elements provided in the communication control unit, based on the current value supplied to the power storage device and the voltage value applied to the power storage device, an effect on coupling of the resonant coils between which power transmission is performed using a magnetic resonance phenomenon can be suppressed, and power transmission efficiency between the power transmitting device and the power receiving device can be maintained in an optimum condition at all times.

Further, when the resistance value of the power storage device and further the resistance value of the power receiving device are increased as the charging of the power storage device proceeds, in the communication between the power transmitting device and the power receiving device, which is performed at the same time as the power feeding, the degree of modulation of a modulation signal used in the communication is changed. In the case where the degree of modulation of the modulation signal is changed, and the signal cannot be read out as a signal, the communication between the power transmitting device and the power receiving device becomes impossible. Thus, as the charging of the power storage device proceeds and the resistance value of the power receiving device is increased, the instability of the communication is increased. However, by the connection of the most appropriate passive element among the passive elements provided in the communication control unit based on the current value supplied to the power storage device and the voltage value applied to the power storage device, the degree of modulation of the modulation signal between the power transmitting device and the power receiving device can be maintained in an optimum condition at all times. Thus, the communication between the power transmitting device and the power receiving device can be stable.

According to one embodiment of the disclosed invention, the passive element may be any one of a capacitor, a coil, and a resistor.

According to one embodiment of the disclosed invention, each of the plurality of switches may be a transistor.

According to one embodiment of the disclosed invention, a power feeding system capable of suppressing a decrease in power transmission efficiency in power feeding to the power storage device can be obtained.

Further, according to one embodiment of the disclosed invention, a power feeding system capable of securing the stability of communication performed at the same time as power feeding can be provided.

DETAILED DESCRIPTION OF THE INVENTION

Figure 1:
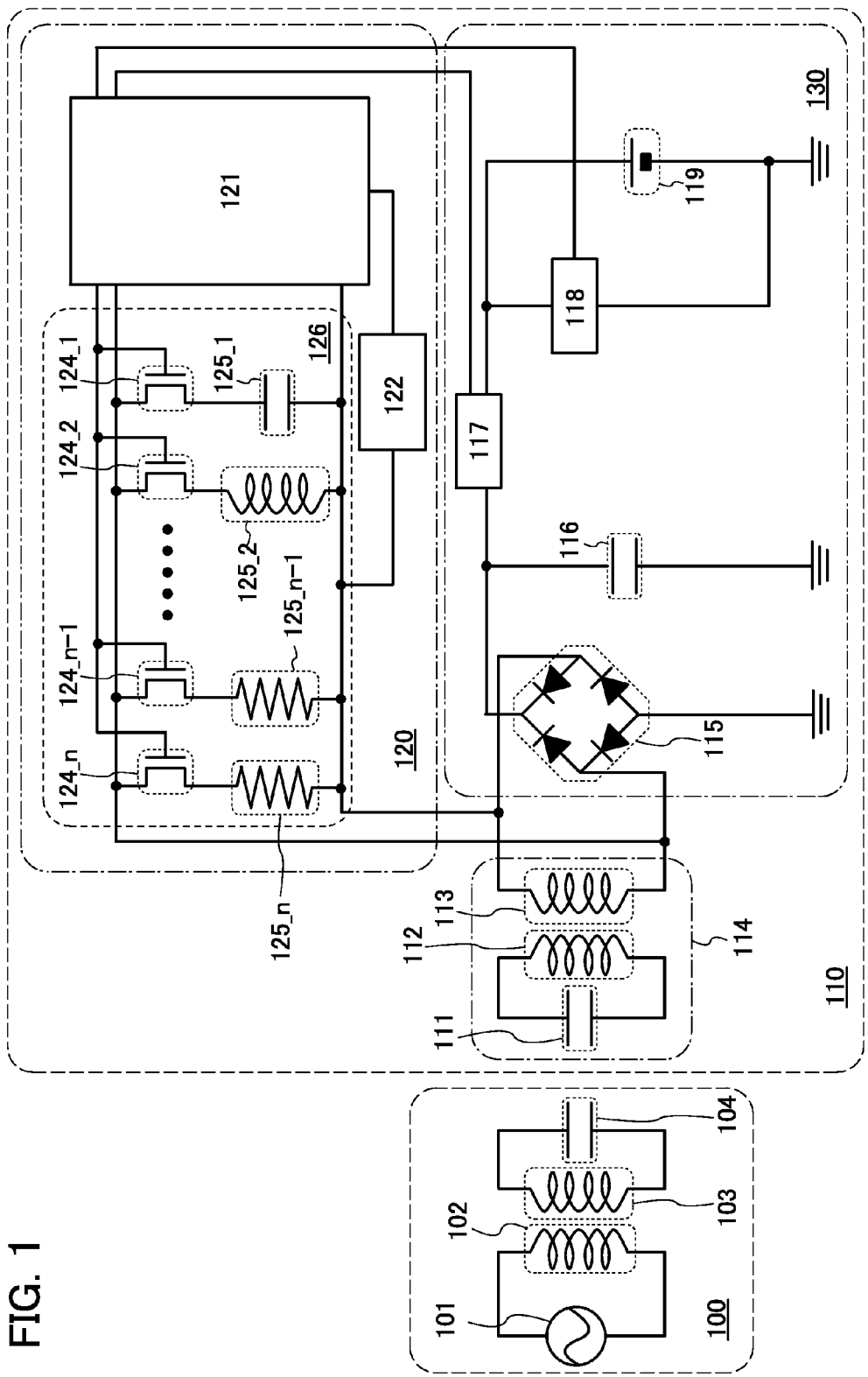
FIG. 1 illustrates a circuit diagram of a power feeding system.

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiment and example. Note that, in the drawings hereinafter shown, the same units or units having similar functions are denoted by the same reference numerals, and repeated description thereof will be omitted.

Note that the position, size, range, or the like of each structure shown in the drawings and the like is not accurately represented in some cases for easy understanding. Therefore, the disclosed invention is not necessarily limited to the position, size, range, or the like as disclosed in the drawings and the like.

In this specification and the like, ordinal numbers such as "first", "second", and "third" are used in order to avoid confusion among components, and the terms do not mean limitation of the number of components.

<Structure of Power Feeding System>

FIG. 1 is a circuit diagram of a power feeding system having a wireless communication function. The power feeding system illustrated in FIG. 1 includes a power transmitting device 100 and a power receiving device 110.

In the power feeding system illustrated in FIG. 1, an electromagnetic wave generated in the power transmitting device 100 is amplitude-modulated and with the use of the amplitude-modulated electromagnetic wave (modulation signal) wireless communication is performed between the power transmitting device 100 and the power receiving device 110. Note that a modulation signal that is transmitted from the power transmitting device 100 to the power receiving device 110 is a transmission signal. Further, a modulation signal that is transmitted from the power receiving device 110 to the power transmitting device 100 is a response signal.

The power transmitting device 100 includes an AC power source 101 for generating AC power, a first electromagnetic induction coil 102, a first resonant coil 103, and a first capacitor 104.

Further, the power receiving device 110 includes an antenna unit 114 including a second capacitor 111, a second resonant coil 112, and a second electromagnetic induction coil 113. Further, the power receiving device 110 includes a charging circuit unit 130 including a rectifier circuit 115, a smoothing circuit 116, a current detection circuit 117, a voltage detection circuit 118, and a power storage device 119. Further, the power receiving device 110 includes a communication control unit 120 including a control circuit 121, a signal receiving circuit 122, and an adjusting circuit 126. The adjusting circuit 126 includes a transistor 124_1 that is a first switch, a capacitor 125_1 that is a first passive element, a transistor 124_2 that is a second switch, a coil 125_2 that is a second passive element, a transistor 124_n−1 that is an (n−1)th switch, a resistor 125_n−1 that is an (n−1)th passive element, a transistor 124_n that is an n-th switch, and a resistor 125_n that is an n-th passive element.

Note that n is a natural number larger than or equal to 2. In this embodiment, the capacitor 125_1, the coil 125_2, the resistor 125_n−1, and the resistor 125_n are used as the first passive element, the second passive element, the (n−1)th passive element, and the n-th passive element, respectively; however, the first to n-th passive elements may each be any one of a capacitor, a coil, and a resistor. The first passive element, the second passive element, the (n−1)th passive element, and the n-th passive element which are shown in FIG. 1 are just examples. Details of what kinds of passive elements are used for the first to n-th passive elements and a method for determining the number of passive elements (the number of n) will be described later.

The AC power source 101 is a power source for generating AC power with a predetermined frequency. A first terminal and a second terminal of the AC power source 101 are electrically connected to one terminal and the other terminal of the first electromagnetic induction coil 102, respectively.

Here, the phrase "being electrically connected" includes the case of being electrically connected indirectly as well as the case of being electrically connected directly. Thus, besides being electrically connected directly to the one terminal and the other terminal of the first electromagnetic induction coil 102, the first terminal and the second terminal of the AC power source 101 may be electrically connected to the one terminal and the other terminal of the first electromagnetic induction coil 102, respectively, through another electrode or a wiring.

The one terminal and the other terminal of the first resonant coil 103 are electrically connected to one terminal and the other terminal of the first capacitor 104, respectively.

Power feeding from the AC power source 101 to the first resonant coil 103 is performed through the first electromagnetic induction coil 102 by an electromagnetic coupling method.

The first electromagnetic induction coil 102 of the power transmitting device 100 and the second electromagnetic induction coil 113 of the power receiving device 110 described below are each, for example, a coil of about one turn, while the first resonant coil 103 of the power transmitting device 100 and the second resonant coil 112 of the power receiving device 110 described below are each, for example, a coil of several turns.

The first resonant coil 103 of the power transmitting device 100 and the second resonant coil 112 of the power receiving device 110 described below are each open at the opposite ends. The first resonant coil 103 and the second resonant coil 112 have capacitors due to stray capacitance. Thus, the first resonant coil 103 and the second resonant coil 112 are LC resonant circuits. Note that the capacitor is not limited to such a stray capacitance method, and the LC resonant circuits may be obtained in such a way that the opposite ends of each coil are electrically connected to a capacitor.

The resonant frequencies (LC resonance) of the first resonant coil 103 of the power transmitting device 100 and the second resonant coil 112 of the power receiving device 110 are set to be the same so that a magnetic resonance phenomenon is produced at a specific frequency.

When the first resonant coil 103 of the power transmitting device 100 and the second resonant coil 112 of the power receiving device 110 face each other, they exhibit a magnetic resonance phenomenon, and thereby efficient power transmission is achieved even when the distance between the resonant coils is large.

In a power transmission technique using coils, there is a parameter k×Q (k is a coupling coefficient and Q is a Q value of a resonant coil) as a parameter that represents an index of high power transmission efficiency. The coupling coefficient k is a coupling coefficient that represents a degree of coupling of the resonant coil on the power feeding side and the resonant coil on the power receiving side. Further, the Q value is a value showing sharpness in a resonance peak of a resonant circuit. As the first resonant coil 103 and the second resonant coil 112, resonant coils having extremely high Q values (for example, the Q is larger than 100 (k×Q is larger than 1)) are preferably used, and thereby a power feeding technique using a magnetic resonant method can realize high power transmission efficiency.

In the power receiving device 110, one terminal and the other terminal of the second resonant coil 112 are electrically connected to one terminal and the other terminal of the second capacitor 111, respectively.

Although, in FIG. 1, the power transmitting device 100 includes the first electromagnetic induction coil 102, the first resonant coil 103, and the first capacitor 104 (referred to as a power transmitting element) and the power receiving device 110 includes the second electromagnetic induction coil 113, the second resonant coil 112, and the second capacitor 111 (referred to as a power receiving element), the present invention is not limited to this structure. The power transmitting element and the power receiving element may each be a magnetic field type element including a helical antenna or an electric field type element including a meander line antenna.

One terminal of the second electromagnetic induction coil 113 is electrically connected to a first terminal of the rectifier circuit 115 and a first terminal of the communication control unit 120. The other terminal of the second electromagnetic induction coil 113 is electrically connected to a second terminal of the rectifier circuit 115 and a second terminal of the communication control unit 120.

The rectifier circuit 115 functions as an AC-DC converter which converts AC power into DC power. As the rectifier circuit 115 of this embodiment, a bridge rectifier including four diodes is used. The first terminal of the rectifier circuit 115 is electrically connected to the one terminal of the second electromagnetic induction coil 113 and the first terminal of the communication control unit 120. The second terminal of the rectifier circuit 115 is electrically connected to the other terminal of the second electromagnetic induction coil 113 and the second terminal of the communication control unit 120. A third terminal of the rectifier circuit 115 is electrically connected to a first terminal of the smoothing circuit 116 and a first terminal of the current detection circuit 117. A fourth terminal of the rectifier circuit 115 is grounded.

The smoothing circuit 116 has a function of smoothing DC power output from the rectifier circuit 115 by storing and releasing the DC power. In this embodiment, a capacitor is used as the smoothing circuit 116. The first terminal of the smoothing circuit 116 is electrically connected to the third terminal of the rectifier circuit 115 and the first terminal of the current detection circuit 117. The second terminal of the smoothing circuit 116 is grounded. Note that the smoothing circuit 116 is not necessarily provided if it is not needed.

The current detection circuit 117 is a circuit which detects a current value supplied to the power storage device 119. The first terminal of the current detection circuit 117 is electrically connected to the third terminal of the rectifier circuit 115 and the first terminal of the smoothing circuit 116. A second terminal of the current detection circuit 117 is electrically connected to a first terminal of the voltage detection circuit 118 and a positive electrode of the power storage device 119. A third terminal of the current detection circuit 117 is electrically connected to a third terminal of the communication control unit 120. Through the third terminal of the current detection circuit 117, information (a signal) of the current value supplied to the power storage device 119 is input to the communication control unit 120.

The voltage detection circuit 118 is a circuit which detects a voltage value applied to the power storage device 119. The first terminal of the voltage detection circuit 118 is electrically connected to the second terminal of the current detection circuit 117 and the positive electrode of the power storage device 119. A second terminal of the voltage detection circuit 118 is electrically connected to a negative electrode of the power storage device 119 and is grounded. A third terminal of the voltage detection circuit 118 is electrically connected to a fourth terminal of the communication control unit 120. Through the third terminal of the voltage detection circuit 118, information (a signal) of the voltage value applied to the power storage device 119 is input to the communication control unit 120.

The positive electrode of the power storage device 119 is electrically connected to the second terminal of the current detection circuit 117 and the first terminal of the voltage detection circuit 118. The negative electrode of the power storage device 119 is electrically connected to the second terminal of the voltage detection circuit 118 and is grounded.

As described above, the communication control unit 120 includes the control circuit 121, the signal receiving circuit 122, and the adjusting circuit 126.

The control circuit 121 has functions of processing and analyzing a transmission signal transmitted from the power transmitting device 100 and generating a response signal containing information of the power receiving device 110. Further, information (a signal) of the current value supplied to the power storage device 119, which is detected by the current detection circuit 117, and information (a signal) of the voltage value applied to the power storage device 119, which is detected by the voltage detection circuit 118, are input to the control circuit 121. The control circuit 121 generates a selection signal for controlling an ON/OFF state of the first to the n-th switches based on the information of the current value and the information of the voltage value. The first to the n-th switches are turned on or off based on the selection signal, and a passive element connected to a switch in an ON state among the passive elements connected to the first to n-th switches electrically functions.

A first terminal of the control circuit 121 is the first terminal of the communication control unit 120, and is electrically connected to one of a source and a drain of the transistor 124_1, one of a source and a drain of the transistor 124_2, one of a source and a drain of the transistor 124_n-1, and one of a source and a drain of the transistor 124_n. A second terminal of the control circuit 121 is the second terminal of the communication control unit 120, and is electrically connected to a first terminal of the signal receiving circuit 122, one terminal of the capacitor 125_1, one terminal of the coil 125_2, one terminal of the resistor 125_n-1, and one terminal of the resistor 125_n. A third terminal of the control circuit 121 is the third terminal of the communication control unit 120, and is electrically connected to the third terminal of the current detection circuit 117. A fourth terminal of the control circuit 121 is the fourth terminal of the communication control unit 120, and is electrically connected to the third terminal of the voltage detection circuit 118. A fifth terminal of the control circuit 121 is electrically connected to a gate of the transistor 124_1, a gate of the transistor 124_2, a gate of the transistor 124_n-1, and a gate of the transistor 124_n. A sixth terminal of the control circuit 121 is electrically connected to a second terminal of the signal receiving circuit 122.

The signal receiving circuit 122 is also referred to as a decoder, which shapes a signal so that a received transmission signal is analyzed by the control circuit 121. Further, the signal receiving circuit 122 has a function of removing noise and the like. The first terminal of the signal receiving circuit 122 is electrically connected to the second terminal of the control circuit 121, the one terminal of the capacitor 125_1, the one terminal of the coil 125_2, the one terminal of the resistor 125_n-1, and the one terminal of the resistor 125_n. The second terminal of the signal receiving circuit 122 is electrically connected to the sixth terminal of the control circuit 121.

The one of the source and drain of the transistor 124_1 that is the first switch is electrically connected to the first terminal of the control circuit 121, the one of the source and drain of the transistor 124_2, the one of the source and drain of the transistor 124_n-1, and the one of the source and drain of the transistor 124_n. The other of the source and drain of the transistor 124_1 is electrically connected to the other terminal of the capacitor 125_1. The gate of the transistor 124_1 is electrically connected to the fifth terminal of the control circuit 121, the gate of the transistor 124_2, the gate of the transistor 124_n-1, and the gate of the transistor 124_n.

The one terminal of the capacitor 125_1 that is the first passive element is electrically connected to the second terminal of the control circuit 121, the first terminal of the signal receiving circuit 122, the one terminal of the coil 125_2, the one terminal of the resistor 125_n-1, and the one terminal of the resistor 125_n. The other terminal of the capacitor 125_1 is electrically connected to the other of the source and drain of the transistor 124_1.

The one of the source and drain of the transistor 124_2 that is the second switch is electrically connected to the first terminal of the control circuit 121, the one of the source and drain of the transistor 124_1, the one of the source and drain of the transistor 124_n-1, and the one of the source and drain of the transistor 124_n. The other of the source and drain of the transistor 124_2 is electrically connected to the other terminal of the capacitor 125_2. The gate of the transistor 124_2 is electrically connected to the fifth terminal of the control circuit 121, the gate of the transistor 124_1, the gate of the transistor 124_n-1, and the gate of the transistor 124_n.

The one terminal of the coil 125_2 that is the second passive element is electrically connected to the second terminal of the control circuit 121, the first terminal of the signal receiving circuit 122, the one terminal of the capacitor 125_1, the one terminal of the resistor 125_n−1, and the one terminal of the resistor 125_n. The other terminal of the coil 125_2 is electrically connected to the other of the source and drain of the transistor 124_2.

The one of the source and drain of the transistor 124_n−1 that is the (n−1)th switch is electrically connected to the first terminal of the control circuit 121, the one of the source and drain of the transistor 124_1, the one of the source and drain of the transistor 124_2, and the one of the source and drain of the transistor 124_n. The other of the source and drain of the transistor 124_n−1 is electrically connected to the other terminal of the resistor 125_n−1. The gate of the transistor 124_n−1 is electrically connected to the fifth terminal of the control circuit 121, the gate of the transistor 124_1, the gate of the transistor 124_2, and the gate of the transistor 124_n.

The one terminal of the resistor 125_n−1 that is the (n−1)th passive element is electrically connected to the second terminal of the control circuit 121, the first terminal of the signal receiving circuit 122, the one terminal of the capacitor 125_1, the one terminal of the coil 125_2, and the one terminal of the resistor 125_n. The other terminal of the resistor 125_n−1 is electrically connected to the other of the source and drain of the transistor 124_n−1.

The one of the source and drain of the transistor 124_n that is the n-th switch is electrically connected to the first terminal of the control circuit 121, the one of the source and drain of the transistor 124_1, the one of the source and drain of the transistor 124_2, and the one of the source and drain of the transistor 124_n−1. The other of the source and drain of the transistor 124_n is electrically connected to the other terminal of the resistor 125_n. The gate of the transistor 124_n−1 is electrically connected to the fifth terminal of the control circuit 121, the gate of the transistor 124_1, the gate of the transistor 124_2, and the gate of the transistor 124_n.

The one terminal of the resistor 125_n that is the n-th passive element is electrically connected to the second terminal of the control circuit 121, the first terminal of the signal receiving circuit 122, the one terminal of the capacitor 125_1, the one terminal of the coil 125_2, and the one terminal of the resistor 125_n−1. The other terminal of the resistor 125_n is electrically connected to the other of the source and drain of the transistor 124_n.

Note that as described above, the first to the n-th passive elements can be any one of a capacitor, a coil, and a resistor. The first passive element, the second passive element, the (n−1)th passive element, and the n-th passive element which are shown in FIG. 1 are just examples. Which passive element among the first to the n-th passive elements provided in the adjusting circuit 126 is used, that is, which switch connected to a passive element is turned on, is determined based on the information (signal) of the resistance value which increases as the charging proceeds, of the power storage device 119 in the power receiving device 110 so that power transmission efficiency and the degree of modulation of a modulation signal between the power transmitting device 100 and the power receiving device 110 are in optimum conditions. The information (signal) of the resistance value of the power storage device 119 is calculated from the information (signal) of the current value supplied to the power storage device 119 and the information (signal) of the voltage value applied to the power storage device 119. The control circuit 121 determines which switch is turned on or off and which passive element is used based on the information (signal) of the resistance value of the power storage device 119 at the same time as the progress of the charging of the power storage device 119.

Accordingly, power transmission efficiency between the power transmitting device and the power receiving device can be maintained in an optimum condition at all times. Thus, a power feeding system capable of suppressing a decrease in power transmission efficiency in power feeding to the power storage device can be obtained.

Further, the degree of modulation of the modulation signal used in the communication between the power transmitting device and the power receiving device can be maintained in an optimum condition at all times. Thus, a power feeding system capable of securing the stability of communication performed at the same time as power feeding can be provided.

<Flowchart Illustrating Operation>

Figure 2:
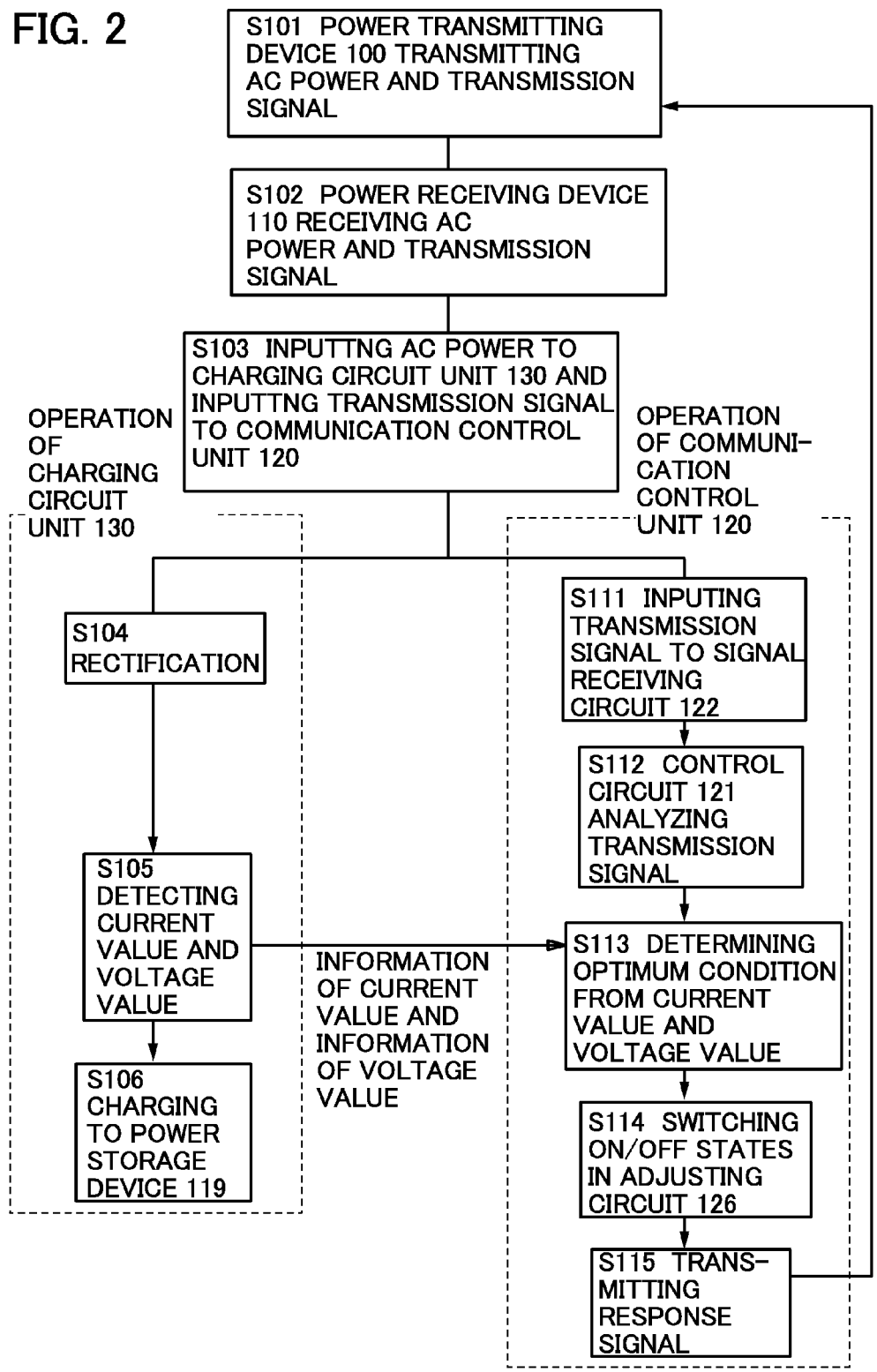
FIG. 2 is a flowchart illustrating the operation of a power feeding system.

FIG. 2 is a flowchart illustrating the operation of a power feeding system according to this embodiment.

First, the power transmitting device 100 transmits AC power and a transmission signal (S101). The AC power and the transmission signal are transmitted from the first electromagnetic induction coil 102 to the first resonant coil 103 by electromagnetic coupling. The resonant frequencies (LC resonance) of the first resonant coil 103 and the first capacitor 104 and the second resonant coil 112 and the second capacitor 111 are each set to be the same. Thus, a magnetic resonance phenomenon is produced between the first resonant coil 103 and the second resonant coil 112 at a specific frequency, and the power receiving device 110 can receive the AC power and the transmission signal (S102).

The received AC power is input to the charging circuit unit 130 and the received transmission signal is input to the communication control unit 120 (S103).

In the charging circuit unit 130, the input AC power is rectified by the rectifier circuit 115 and is converted from the AC power to the DC power (S104).

When the obtained DC power is input to the power storage device 119, the current value supplied to the power storage device 119 and the voltage value applied to the power storage device 119 are detected by the current detection circuit 117 and the voltage detection circuit 118, respectively (S105). The information (signal) of the obtained current value and the information (signal) of the obtained voltage value are each input to the control circuit 121 in the communication control unit 120. The power storage device 119 is charged by the DC power (S106).

Further, after the step S103, the transmission signal that is input to the communication control unit 120 is input to the signal receiving circuit 122 (S111). The signal receiving circuit 122 shapes the transmission signal so that the transmission signal can be analyzed by the control circuit 121.

The transmission signal shaped by the signal receiving circuit 122 is input to the control circuit 121, and analyzed by the control circuit 121 (S112).

The information (signal) of the current value and the information of the voltage value which are detected in the step S105 are input to the control circuit 121. The control circuit 121 determines which of the first to the n-th passive elements is used to provide optimum power transmission efficiency and an optimal degree of modulation of the modulation signal (the transmission signal and the response signal) (S113) between the power transmitting device 100 and the power receiving device 110.

The control circuit 121 generates a selection signal to determine which of the switches is turned on or off based on the decision made in the step S113, and switches On/Off states of the switches connected to the first to the n-th passive elements (S114) by the selection signal. Thus, the resistance value of the power receiving device 110 is changed so as to obtain optimum power transmission efficiency and an optimal degree of modulation.

By the step S114, the response signal with an optimal degree of modulation is transmitted from the power receiving device 110 to the power transmitting device 100 (S115).

The power transmitting device 100 which has received the response signal transmits a new transmission signal based on the received response signal to the power receiving device 110.

Accordingly, in the power feeding system according to this embodiment, even in the case where the resistance value of the power receiving device 110 is increased with the progress of charging of the power storage device 119, AC power can be transferred with optimum transmission efficiency at all times and communication can be performed using a modulation signal with an optimal degree of modulation.

According to this embodiment, a decrease in power transmission efficiency in power feeding to a power storage device can be suppressed, and the stability of communication performed at the same time as the power feeding can be secured.

EXAMPLE

In this example, results of the measurement performed by the power feeding system according to one embodiment of the disclosed invention will be described.

<Structure of Power Feeding System>

Figure 3:
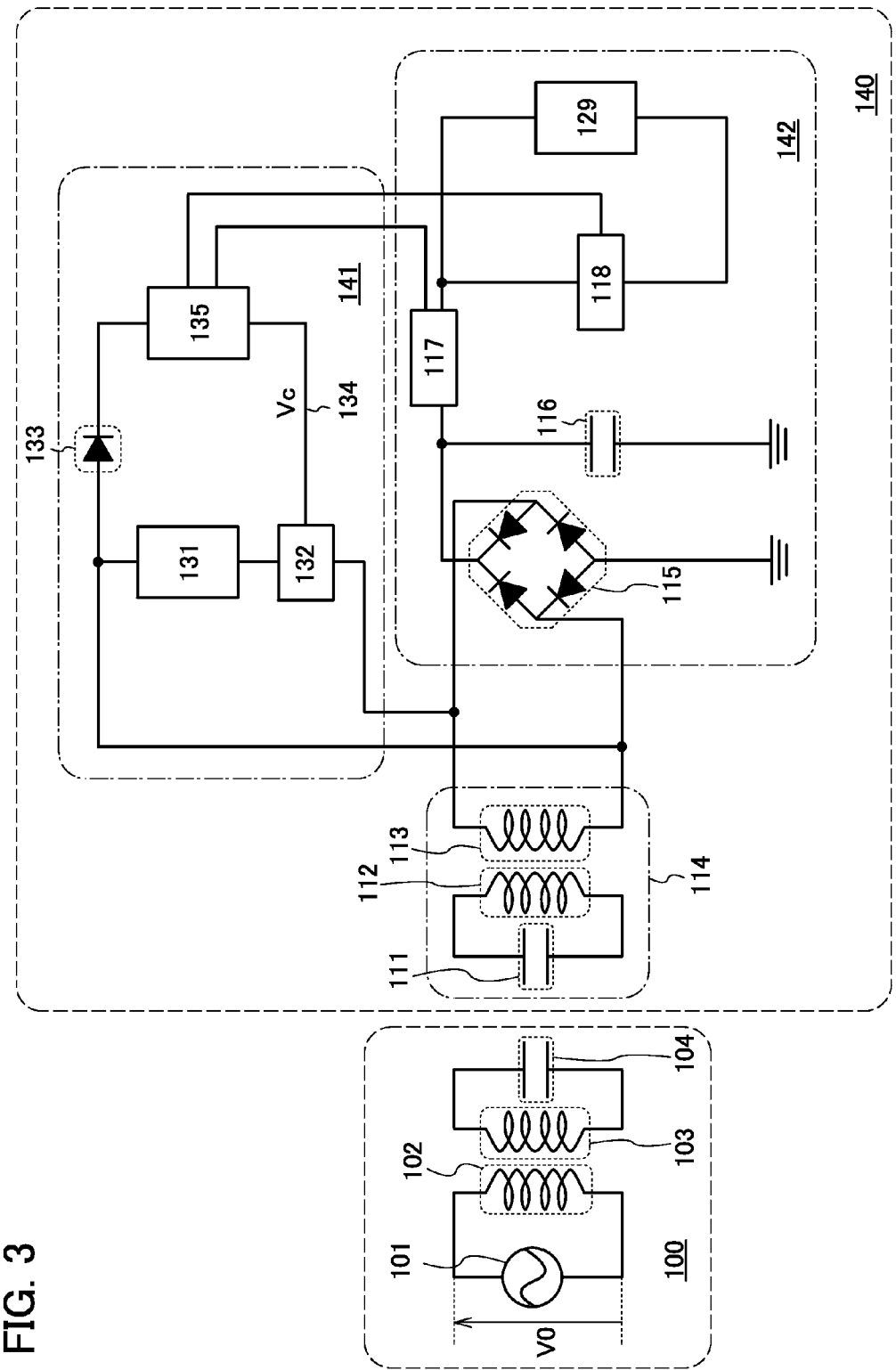
FIG. 3 illustrates a circuit diagram of a power feeding system.

FIG. 3 illustrates a structure of a power feeding system used in this example. The power feeding system illustrated in FIG. 3 includes the power transmitting device 100 and a power receiving device 140. Note that the power transmitting device 100 illustrated in FIG. 3 is the same as that in FIG. 1; thus, the description in Embodiment 1 can be referred to.

The power receiving device 140 illustrated in FIG. 3 includes the antenna unit 114, a load unit 142 and a communication control unit 141. The load unit 142 includes the rectifier circuit 115, the smoothing circuit 116, the current detection circuit 117, the voltage detection circuit 118, and a load 129. The communication control unit 141 includes a resistor 131, a switch 132, a diode 133, and a control circuit 135. Further, a first terminal of the switch 132 and the control circuit 135 are connected to each other through a wiring 134.

The antenna unit 114, the rectifier circuit 115, the smoothing circuit 116, the current detection circuit 117, and the voltage detection circuit 118 which are in the power receiving device 140 are the same as those described in Embodiment 1; thus, the description in Embodiment 1 can be referred to.

The load 129 in the power receiving device 140 is provided instead of the power storage device 119 in FIG. 1. Further, the resistor 131 in the power receiving device 140 is provided instead of the adjusting circuit 126 in FIG. 1. In this example, instead of switching On/Off states of the transistor 124_1 to the transistor 124_n in the adjusting circuit 126, the resistance value of the resistor 131 was changed so that the degree of modulation of a modulation signal was adjusted. For comparison, measurement was also performed on a power feeding system where the resistance value of the resistor 131 was not changed so that the degree of modulation of the modulation signal was not adjusted. Under the above conditions, the relation between power transmission efficiency and the communication success rate was examined.

The current value supplied to the load 129 is detected by the current detection circuit 117. The voltage value applied to the load 129 is detected by the voltage detection circuit 118. The detected current value and voltage value are input to the control circuit 135. A first terminal of the resistor 131 is a first terminal of the communication control unit 141, and is electrically connected to the one terminal of the second electromagnetic induction coil 113, the first terminal of the rectifier circuit 115, and an input terminal of the diode 133. A second terminal of the resistor 131 is electrically connected to a second terminal of the switch 132.

The switch 132 controls electrical connection and disconnection of the second terminal and a third terminal of the switch 132 based on the signal that is input to the first terminal of the switch 132 from the control circuit 135. The first terminal of the switch 132 is electrically connected to a second terminal of the control circuit 135 through the wiring 134. Note that the potential of the wiring 134 is set to a potential Vc (the detail is described later). The second terminal of the switch 132 is electrically connected to the second terminal of the resistor 131. The third terminal of the switch 132 is a second terminal of the communication control unit 141, and is electrically connected to the other terminal of the second electromagnetic induction coil 113 and the second terminal of the rectifier circuit 115.

The input terminal of the diode 133 is electrically connected to the first terminal of the resistor 131. An output terminal of the diode 133 is electrically connected to the first terminal of the control circuit 135.

The control circuit 135 has functions of processing and analyzing a transmission signal transmitted from the power transmitting device 100, generating a response signal containing information of the power receiving device 140, controlling the resistance value of the resistor 131, and controlling the potential Vc applied to the first terminal of the switch 132 through the wiring 134.

A high-level or a low-level potential output from the second terminal of the control circuit 135 is applied to the first terminal of the switch 132 using the wiring 134. Thus, in the case where the potential output from the second terminal of the control circuit 135 is a high-level potential, the second terminal and the third terminal of the switch 132 are electrically connected to each other, whereas in the case where the potential output from the second terminal of the control circuit 135 is a low-level potential, the second terminal and the third terminal of the switch 132 are not electrically connected to each other.

The first terminal of the control circuit 135 is electrically connected to the output terminal of the diode 133. The second terminal of the control circuit 135 is electrically connected to the first terminal of the switch 132 through the wiring 134. Information (a signal) of the current value from the current detection circuit 117 is input to a third terminal of the control circuit 135. Information (a signal) of the voltage value from the voltage detection circuit 118 is input to a fourth terminal of the control circuit 135.

<Power Transmission>

Figure 5:
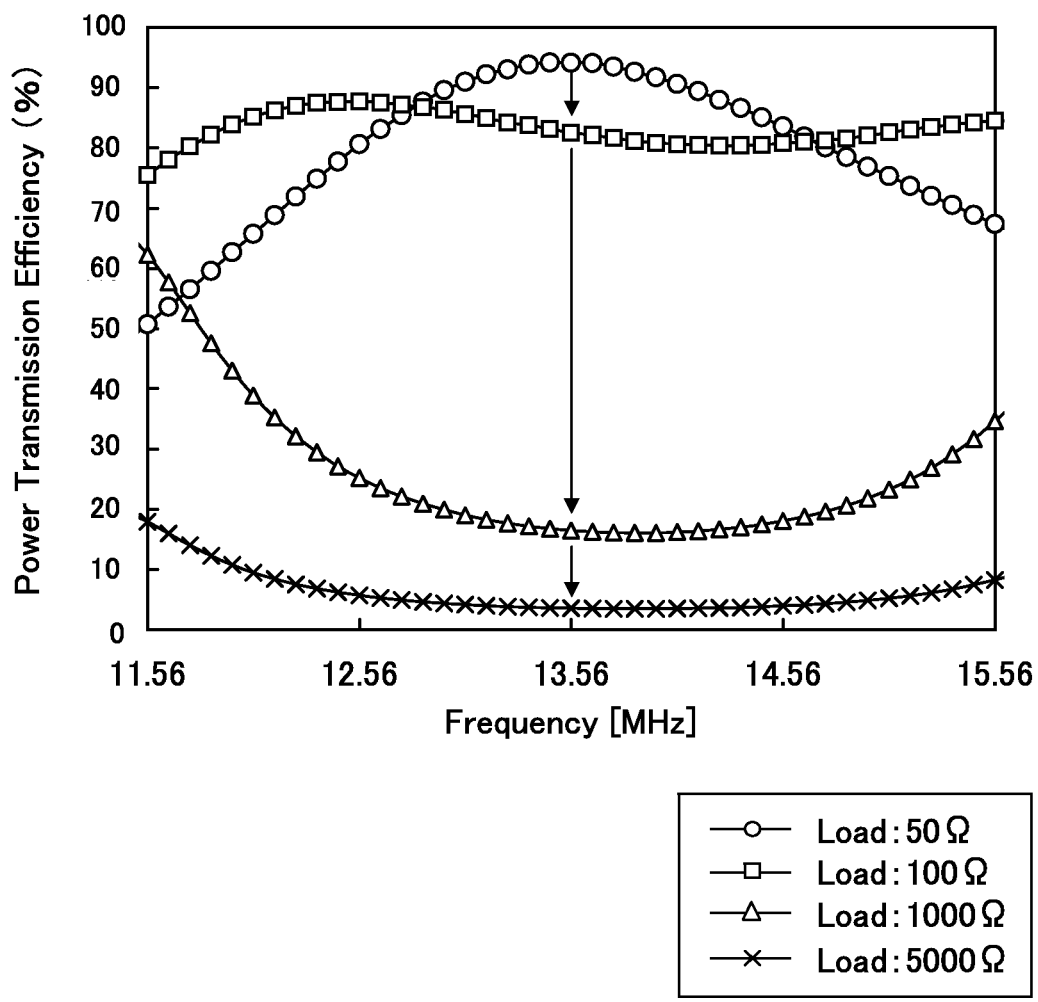
FIG. 5 illustrates the relation between a frequency and power transmission efficiency when a load is changed.

FIG. 5 illustrates the relation between a frequency and power transmission efficiency with the load 129 having the resistance values of 50Ω, 100Ω, 1000Ω, and 5000Ω. FIG. 5 shows that at a frequency of 13.56 MHz, which is used as the frequency of a wireless communication system using RFID technology, the higher the resistance value of the load 129 is, the lower the power transmission efficiency becomes.

Figure 7:
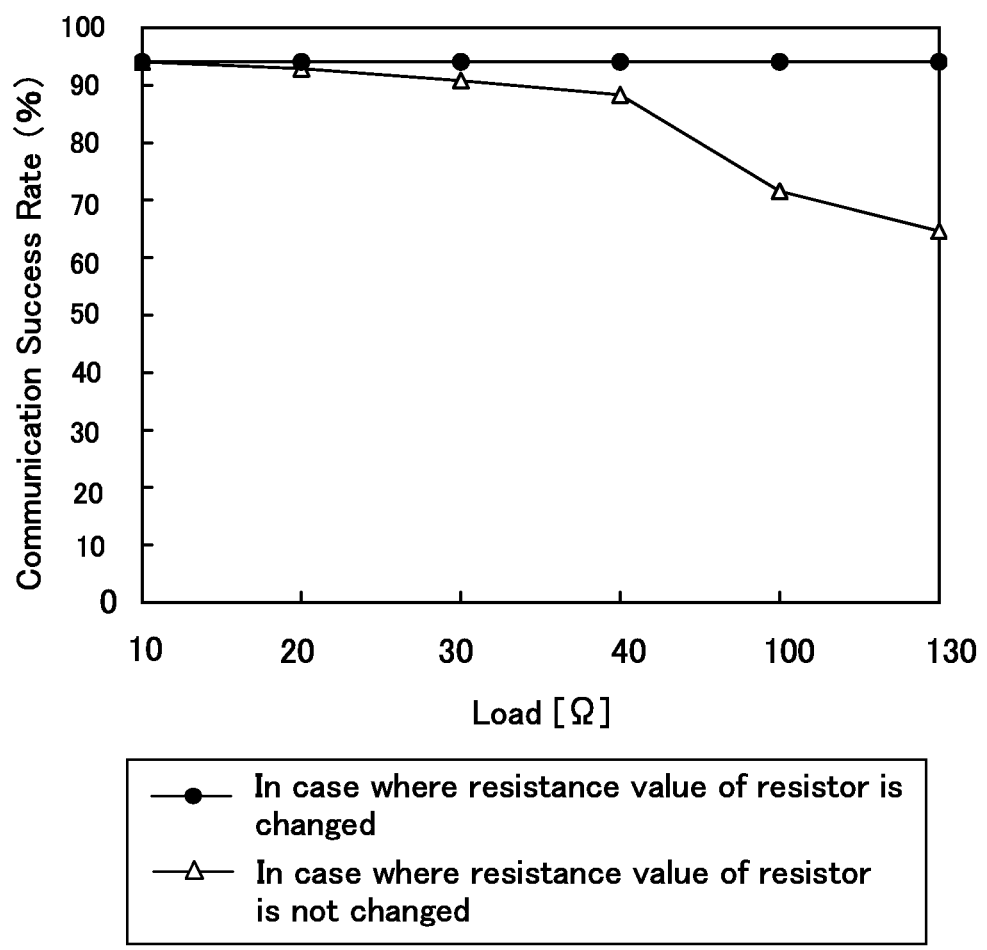
FIG. 7 illustrates the relation between a resistance value of a load and power transmission efficiency.

FIG. 7 shows the relation between the resistance value of the load 129 and the power transmission efficiency when the resistance value of the resistor 131 is changed and when the resistance value of the resistor 131 is not changed. In FIG. 7, measurement was performed with the frequency of 13.56 MHz. Note that when the resistance value of the resistor 131 was changed, the current value supplied to the load 129 and the voltage value applied to the load 129 were fed back in accordance with the flowchart in FIG. 2 so that the resistance value of the resistor 131 was changed.

As shown in FIG. 7, when the resistance value of the resistor 131 is changed, the power transmission efficiency is almost constant at 90% or more. On the other hand, when the resistance value of the resistor 131 is not changed, the power transmission efficiency is decreased as the resistance value of the load 129 is increased; specifically, the power transmission efficiency is drastically decreased when the resistance value of the load 129 is around 100Ω. As described, when the resistance value of the resistor 131 is not changed, the power transmission efficiency is decreased as the resistance value of the load 129 is increased.

According to this example, it is found that the decrease in power transmission efficiency can be suppressed in the power feeding system in which the resistance value of the resistor 131 is changed and the degree of modulation of a modulation signal is adjusted.

<Communication>

Figure 4A:
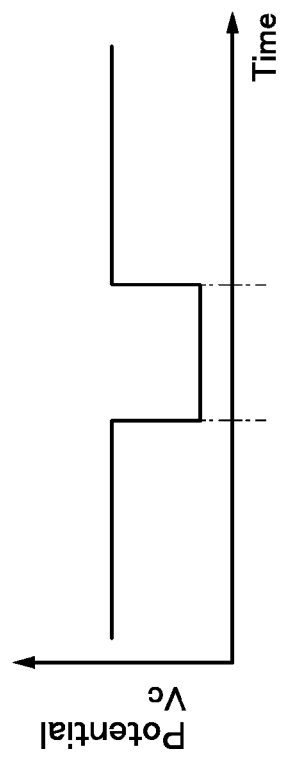
FIGS. 4A to 4D illustrate voltage amplitudes.
Figure 4B:
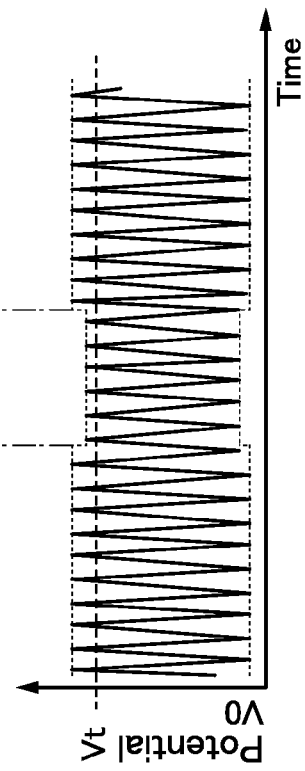
Figure 4C:
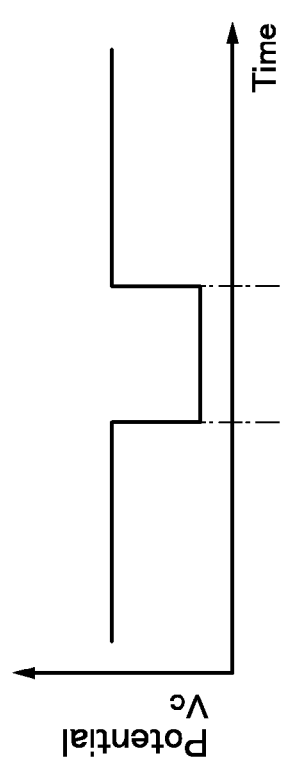
Figure 4D:
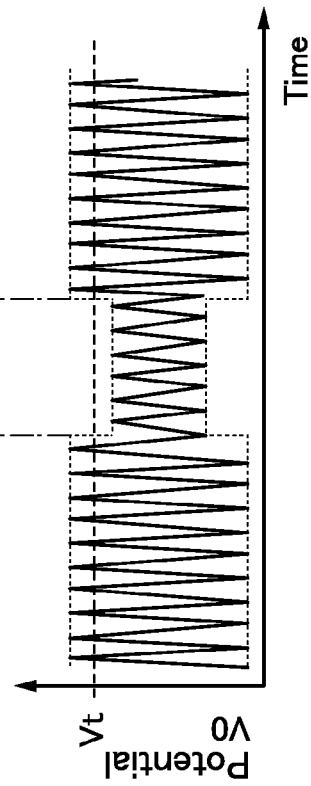

FIGS. 4A to 4D illustrate voltage amplitudes of the potential Vc of the wiring 134 and voltage amplitudes of the potential V0 of the AC power source 101 when the resistance value of the resistor 131 is changed. In FIGS. 4A and 4C, the vertical axis represents the potential Vc, and the horizontal axis represents time. Further, in FIGS. 4B and 4D, the vertical axis represents the potential V0, and the horizontal axis represents time. FIGS. 4A and 4B illustrate the voltage amplitude of the potential Vc and the voltage amplitude of the potential V0, respectively, when communication is successful. FIGS. 4C and 4D illustrate the voltage amplitude of the potential Vc and the voltage amplitude of the potential V0, respectively, when communication is failed. Note that the voltage amplitudes of the potential Vc illustrated in FIGS. 4A and 4C are the same. When the potential Vc is changed from the high-level potential to the low-level potential, the voltage amplitude of the potential V0 becomes small. On the contrary, when the potential Vc is changed from the low-level potential to the high-level potential, the voltage amplitude of the potential V0 becomes large.

Note that in this example, the high-level potential is 3.3V, and the low-level potential is 0V.

The threshold potential Vt shown in FIGS. 4B and 4D is a reference potential to determine whether the potential is the high-level potential or the low-level potential. In this example, when the maximum value of the voltage amplitude is larger than the threshold potential Vt, the potential is considered as the high level potential, whereas when the maximum value of the voltage amplitude is smaller than the threshold potential Vt, the potential is considered as the low level potential. In this example, the value of the threshold potential Vt is determined in consideration of the noise voltage amplitude of the potential V0.

As illustrated in FIG. 4B, when communication is successful, there is a sufficient difference in the voltage amplitude of the potential V0 corresponding to the change of the potential Vc from the high-level potential to the low-level potential or the change of the potential Vc from the low-level potential to the high-level potential. In the case where there is a sufficient difference in the voltage amplitude of the potential V0 as described above, the modulation signal can be transmitted and received.

On the other hand, as illustrated in FIG. 4D, even when the potential Vc is changed from the high-level potential to the low-level potential, or from the low-level potential to the high-level potential, a sufficient difference cannot be observed in the voltage amplitude of the potential V0. That is, in the voltage amplitude of the potential V0 illustrated in FIG. 4D, the potential is always considered as the high-level potential and signal transmission is not possible with this voltage amplitude. Thus, when the potential V0 illustrated in FIG. 4D is obtained, communication is not possible.

Figure 6:
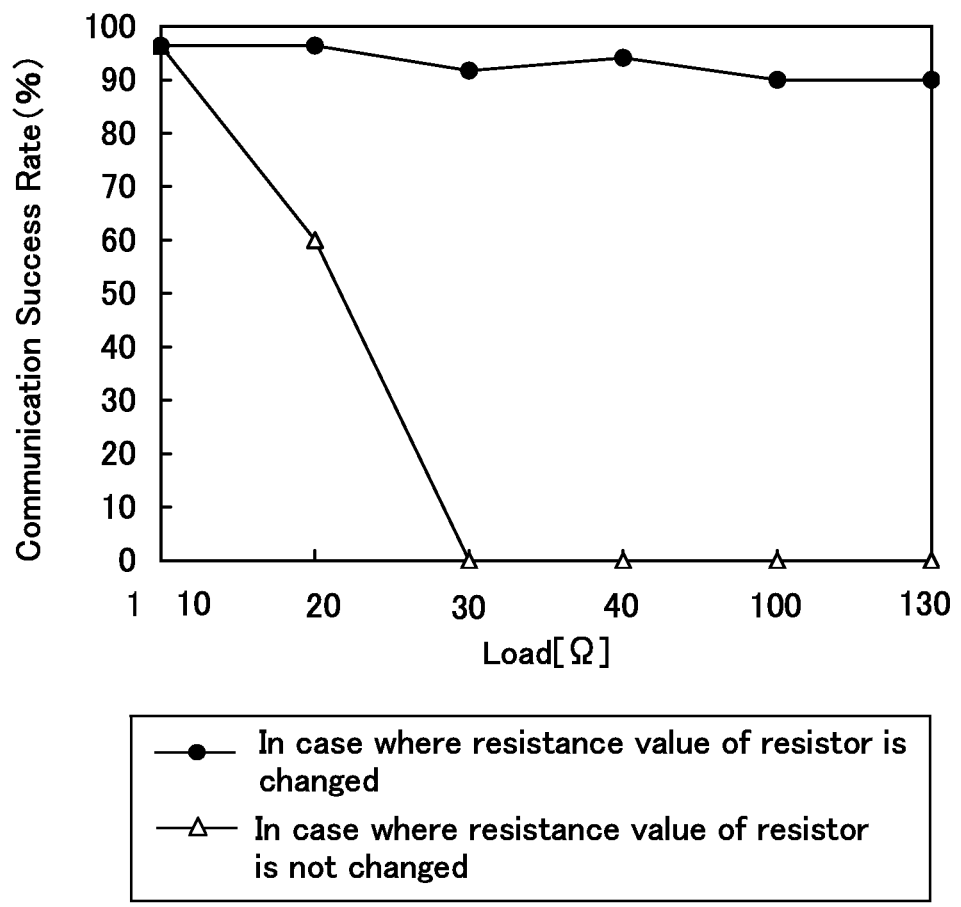
FIG. 6 illustrates the relation between a resistance value of a load and a communication success rate.

FIG. 6 illustrates the relation between the resistance value of the load 129 and the communication success rate in the case where the resistance value of the resistor 131 is changed and in the case where the resistance value of the resistor 131 is not changed. Also in FIG. 6, the measurement was performed with a frequency of 13.56 MHz.

In this example, operation where the power transmitting device 100 transmits a modulation signal (transmission signal) to the power receiving device 140, the power receiving device 140 receives the transmitted modulation signal, and the power receiving device 140 sends a modulation signal (a response signal) corresponding to the received modulation signal back to the power transmitting device 100 is considered as one cycle, and 50 cycles of this operation were performed. The communication success rate illustrated in FIG. 6 is the rate of successful communication in 50 cycles of the operation.

As illustrated in FIG. 6, when the resistance value of the resistor 131 is changed, the communication success rate is almost constant at 90% or more. However, when the resistance value of the resistor 131 is not changed, the communication success rate is decreased as the resistance value of the load 129 is increased, and the communication success rate becomes 0% when the resistance value of the load 129 is 30Ω. That is, in the case where the resistance value of the resistor 131 is not changed, communication between the power transmitting device 100 and the power receiving device 140 is not possible when the resistance value of the load 129 is 30Ω or more.

This example shows that a decrease in power transmission efficiency can be suppressed by the change in the resistance value of the resistor 131 even in the case where the load 129 is increased.

Further, this example shows that the stability of communication can be secured by the change in the resistance value of the resistor 131 and adjustment of the degree of modulation of a modulation signal even in the case where the load 129 is increased.

This application is based on Japanese Patent Application serial no. 2011-275256 filed with Japan Patent Office on Dec. 16, 2011, the entire contents of which are hereby incorporated by reference.

What is claimed is:

1. A power feeding system comprising:
a power transmitting device comprising an AC power source, a first electromagnetic induction coil, a first resonant coil, and a first capacitor, and
a power receiving device comprising:
an antenna unit comprising a second resonant coil, a second capacitor, and a second electromagnetic induction coil;
a charging circuit unit comprising a rectifier circuit, a power storage device, a current detection circuit for detecting a current value supplied to the power storage device, and a voltage detection circuit for detecting a voltage value applied to the power storage device; and a communication control unit comprising a signal receiving circuit, a control circuit for generating a selection signal based on the detected current value and the detected voltage value, a first switch, a second switch, a third switch, a third capacitor, a first coil and a resistor, wherein the signal receiving circuit is electrically connected to the control circuit, the third capacitor, the first coil and the resistor, wherein the control circuit is electrically connected to the first switch, the second switch and the third switch, wherein the first switch is electrically connected to the third capacitor, wherein the second switch is electrically connected to the first coil, and wherein the third switch is electrically connected to the resistor.

2. The power feeding system according to claim 1, wherein each of the first switch, the second switch and the second switch is a transistor.

3. The power feeding system according to claim 2, wherein the control circuit is electrically connected to a gate electrode of the transistor.

4. The power feeding system according to claim 1, wherein the charging circuit unit comprises a smoothing circuit.

5. A power receiving device comprising:
an antenna unit comprising a resonant coil, a first capacitor, and an electromagnetic induction coil;
a charging circuit unit comprising a rectifier circuit, a power storage device, a current detection circuit for detecting a current value supplied to the power storage device, and a voltage detection circuit for detecting a voltage value applied to the power storage device; and
a communication control unit comprising a signal receiving circuit, a control circuit for generating a selection signal based on the detected current value and the detected voltage value, a first switch, a second switch, a third switch, a second capacitor, a first coil and a resistor, wherein the first coil is electrically connected to one of the plurality of switches, wherein the resistor is electrically connected to another one of the plurality of switches, wherein the signal receiving circuit is electrically connected to the control circuit, the second capacitor, the first coil and the resistor, wherein the control circuit is electrically connected to the first switch, the second switch and the third switch, wherein the first switch is electrically connected to the second capacitor, wherein the second switch is electrically connected to the first coil, and wherein the third switch is electrically connected to the resistor.

6. The power receiving device according to claim 5, wherein each of the first switch, the second switch and the third switch is a transistor.

7. The power receiving device according to claim 6, wherein the control circuit is electrically connected to a gate electrode of the transistor.

8. The power receiving device according to claim 5, wherein the charging circuit unit comprises a smoothing circuit.

* * * * *